Figure 1:
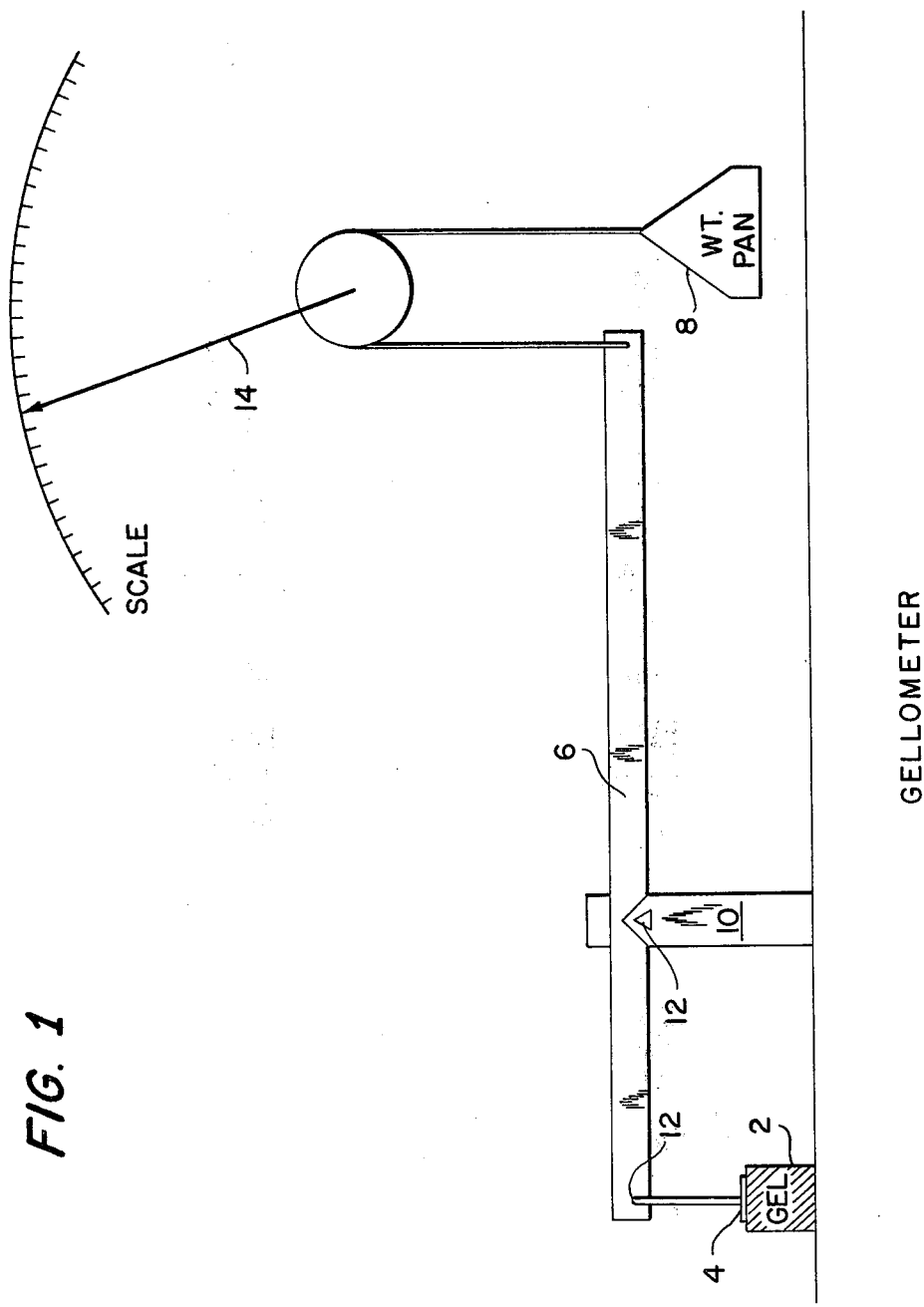

United States Patent [19]

Pour-El et al.

[11] 3,932,672

[45] Jan. 13, 1976

[54] GELLABLE PROTEIN

[76] Inventors: Akiva Pour-El, 1389 Keston St., St. Paul, Minn. 55108; Thomas C. Swenson, Rte. No. 1, Box 340, Deerwood, Minn. 56444

[22] Filed: Sept. 19, 1974

[21] Appl. No.: 507,649

[52] U.S. Cl. .................. 426/46; 426/52; 426/564; 426/573; 195/29
[51] Int. Cl.² ..................... A23L 1/20; A23J 3/02
[58] Field of Search .............. 426/167, 46, 52, 564; 195/29

[56] References Cited
UNITED STATES PATENTS

| | | | |
|---|---|---|---|
| 3,761,353 | 9/1973 | Noe | 426/52 |
| 3,857,966 | 12/1974 | Feldman et al. | 426/46 |

FOREIGN PATENTS OR APPLICATIONS

| | | | |
|---|---|---|---|
| 478,778 | 11/1951 | Canada | 426/52 |

Primary Examiner—Jeanette M. Hunter
Attorney, Agent, or Firm—Plumley & Tyner

[57] ABSTRACT

A gellable and whippable protein is produced having characteristics exhibited by egg white protein by enzymatic treatment of a vegetable protein isolate at alkaline pH, reisolation at isoelectric pH, raising the pH thereafter, reducing the pH to about neutral and drying. The thus produced modified protein material exhibits molecular configurations similar to natural egg white protein and can be compounded and heated at about 140°–190°F. for about 10 minutes to form a gel and/or may be whipped.

5 Claims, 2 Drawing Figures

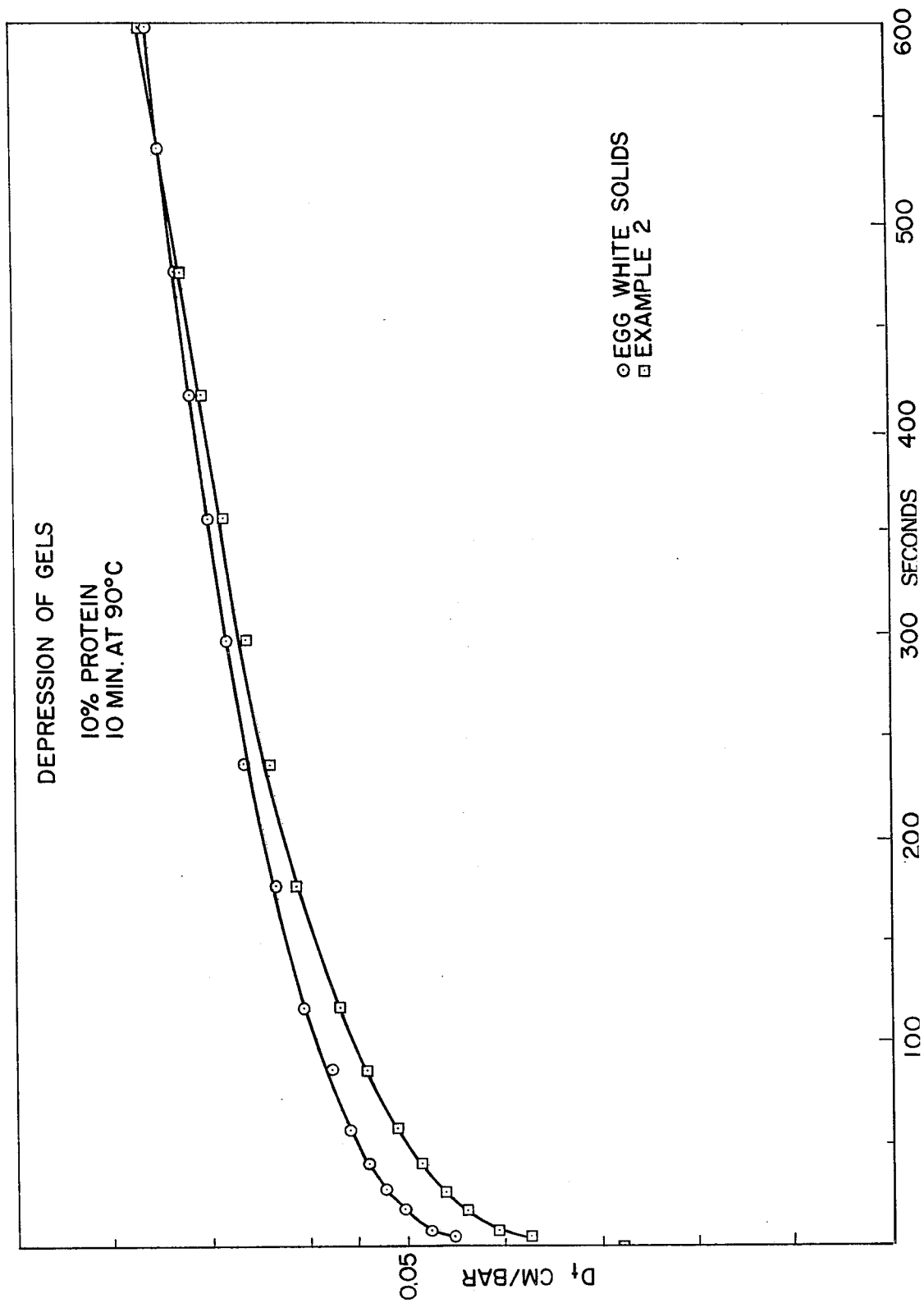

GELLABLE PROTEIN

This invention relates to edible proteinaceous materials derived by enzymolysis from vegetable proteins, particularly from soy protein. The purpose of the invention is to provide a composition which surpasses previously used egg white substitutes and which forms an economical and adequate substitute for use in gelling and whipping compositions, as in food toppings, etc., wherein egg white has normally been used in the past.

In the prior art, many attempts have been made to produce whippable compositions from proteinaceous materials, including vegetable materials and even including soy protein. Those attempts as related to modifying the gelling characteristics of soy protein generally were limited, however, to non-enzymatic modifications (e.g., solvent extraction, etc.) See U.S. Pat. No. 3,594,192. However, these materials, while achieving a degree of modification adapting the protein to whip and exhibit characteristics similar to egg white, have not been satisfactorily gellable. As is apparent to those skilled in the art, natural egg white protein is capable of being whipped and of gelling, whereby a firm but light topping is achieved for pastry and bakery products. The previously modified protein materials have exhibited good whipping characteristics but have failed in that they do not gel, as egg white does. Accordingly, users are frequently disappointed to find that the toppings produced with the artificial proteinaceous materials become soft and "mushy" within a short period of time, and no firm, stable gel results.

According to this invention, a process is provided for modifying vegetable proteins to produce not only the whipping characteristics desired but also the ability to form an irreversible gel, which enables said proteinaceous material produced, which is likewise novel, to be used as a substitute for egg white solids.

To elaborate on the gelling characteristics, the nature of gels should be explored. "Gels" are commonly regarded as two-phase systems with a high degree of interface between a continuous, or at least intermeshed, system of solid material holding an aqueous (or other solvent) phase which may also be continuous or finely dispersed. The solid material is usually thought of as fibrillar in form and may consist either of strongly solvated molecules, such as proteins, or of threadlike crystals, as in gels of silicic acid or crystalline cellulose. A certain degree of structural stability is contributed by the extended skeleton of the continuous phase so that the system as a whole possesses many of the properties of a solid, e.g., rigidity and elastic response to applied distorting forces.

Gels commonly found in food systems include starch gels, protein gels, and polyuronic acid gels. The principal protein gels are derived from collagen or connective tissues of animals. The distinguishing feature of gelatin is its ability to form rigid gels from cooled aqueous sols at concentrations of 1 percent or below. Gelatin occurs as the result of the binding together of protein molecular chains, principally by hydrogen bonding. The major uses of gelatin are in dessert and salad bases, canned meats, and several kinds of confectionary.

Regarding the whipping characteristics, it is merely necessary to have a foamable composition. While many whippable materials are known, few are both whippable and gellable. In particular, the food industry has used egg white or egg albumen to form a gelling and foaming material. Egg white contains about twelve percent solids, principally protein. Thermal denaturation of egg albumen results in formation of a firm gel. The use of egg white in the food industry is based on its ability to form foams rigid enough to support large amounts of other ingredients. Egg white coagulates rapidly at 130°–135°F. High concentrations of sucrose, some inorganic salts and high protein concentrations tend to elevate the coagulation temperature. Coagulation or precipitation of egg albumen requires the presence of salts to precipitate the protein.

The process of this invention is based upon the discovery that modification of soy protein to approximate the egg albumen can be achieved by modifying the size of the protein molecule (soy protein is a larger molecule), modifying the number and availability of sulfhydryl groups and modifying the intermolecular bonding forces or "tightness" of the protein molecule (soy protein is generally "tighter"). In terms of these characteristics, egg albumen has a molecular weight of about 46,000, about five free sulfhydryl groups per molecular weight unit, and a relatively loose molecular structure. The function of sulfhydryl groups in gelling proteins such as egg albumen is to form protein-protein bonds through disulfide linkages, thereby forming a protein matrix which can be solvated by water to form a gel structure. The thus formed gel structure, by disulfide bonding, is generally thermally irreversible (in contrast to gelatin gels, where proteins are bound together primarily by hydrogen bonding and which are consequently thermally reversible).

The comparison of gel strengths and stability of gels is accomplished by derived comparison tests, one of which is illustrated in FIG. 1. In FIG. 1, a gelometer using applied pressure is shown.

In affecting the modification of soy protein according to this invention, the process of this invention first enzymatically reduces the average molecular weight of the soy protein (naturally about 105,000 to 310,000), which at the same time forms a more loose arrangement (which is required in order that the molecules have sulfhydryl groups within reach of one another) capable of bonding to form a matrix during gellation. This change in molecular structure is accomplished by enzymatic degradation of a previously separated protein (isolate) at alkaline pH. The degradation must be controlled in order to achieve the correct structure approximating that of egg albumen. Subsequently, sulfhydryl groups are introduced by the addition of, for example, cysteine, or other sulfhydryl-containing compounds.

More specifically, the two essential steps of this invention will be further considered. The first is an enzymatic treatment which, as stated above, loosens and reduces the size of the molecular unit. A protein, for example, Promine D, (Central Soya Co.) a commercially available isolated soy protein, or Nutrisoy 7-B (Archer Daniels Midland Company) an extracted soy flake can be treated with proteolytic enzymes, for example ficin or bromelin and the protein fractions reduced are separated on the basis of molecular size and solubility in acid solution. Ficin is especially preferred. This separation produces an active gelling fraction which is insoluble in acid and is called acid insoluble protein fractions (AIPF). This material forms a solid gel when heated at about 60°–90°C for about 5–60 mins. at a pH about 6.9 in the presence of one half to one molar (0.5 percent) sodium chloride and 2.46 milligrams cysteine per gram of protein. A 5–10 percent concentration of AIPF forms the best gels. By comparison, 5 percent egg white forms a slightly cloudy precipitate at 55°C. The addition of sodium chloride greatly increases the rate of gellation by precipitating the protein, but the AIPF still gels in the absence of sodium chloride, whereas egg white requires such salt to gel.

Modifications of this preferred technique are possible. It is possible to start with soybean flour rather than the isolated protein described above. The soy flour may be defatted; however, the results are generally less favorable when such material is used and an isolation must be used during the process.

In the enzymatic treatment, it is necessary, to optimize the gellability, to terminate at the correct point. Termination is preferred, according to this process, by washing to remove enzyme and then inherently incapacitating residual enzyme. Other methods, though less desirable, can be used. For example, it is known that enzymatic conversions may be terminated by many processes. Included are heating to denature the enzyme, and thus inactivate it, but this procedure is not desirable in this invention since the soy protein being treated is also subject to being denatured and rendered unsuitable for gelling purposes. Other known processes include the use of pH treatments; the use of insoluble forms of the enzyme (for example, enzymes chemically attached to aminoethyl cellulose) which are kept in solution by agiation and, upon termination, are allowed to precipitate, or the use of protein inactivating enzymes (for example, in other processes the addition of antitrypsin inactivates the enzyme trypsin). All of these have been found to produce less desirable effects upon the soy protein being treated and to reduce the ability of said material to gel after modification. Accordingly, the method of termination used in this invention is the simplest yet, in many respects, the most effective. According to this invention, the enzyme is removed by repeated washings, and any residual enzyme is inactivated by the treatments specifically used for modifying the molecular structure of the protein.

Proteolytic enzymes are to be used for the inventive processes which enzymes include trypsin, ficin, papain, pepsin, bromelin, prolase, protease P, pancreatin, milezyme 8-X and alkaline protease. Generally, ficin is desired as it produces the firmest gels, and more generally, plant and microbiologically grown proteases are more effective than animal proteases. In some instances it may be desirable to use microbiologically produced proteases since the gels produced, although weaker, have higher water holding capacity than the plant proteases. The enzyme is added to the protein in quantities of about 0.02 to 0.2 percent, based on the amount of protein used.

The examples to be shown in the present application utilize the enzyme ficin acting on an isolated soy protein fraction. However, as discussed above, other enzymes and other protein materials can be used. Specifically, other seed proteins, such as sunflower seed and sesame seeds, can be modified by proteases and converted into gelling, whipping compounds.

The steps of the process to be used generally involve a pre-treatment of the protein material which can either be direct digestion, wherein the whole extract of the base material is used after separation from insoluble material, or isolated protein digestion, in which the protein was at first isolated by isoelectric precipitation at pH 4.75 followed by two water washings. Generally speaking, isolated protein is desired. If whole protein is used, the isoelectric precipitation occurs following digestion. By either method an isolate (70–90, or more, % protein) will be treated by this invention.

The pH for digestion in the process is alkaline; for ficin it is in the range of 9–9.6. If other enzymes are used, their optimum pH of activity should also be used always, however, using an alklaine-active enzyme. The optimum temperature during digestion is in the range of 90°–110°F, but slightly higher temperatures can be used. The time of digestion is generally immaterial; however, it can range from one to 24 hours, preferred time under one hour. It is generally found, as shown in the examples disclosed herein, that the gel strength is reduced if too high digestion time and/or digestion temperature is used. The above ranges are moreover desirable for economical purposes.

After digestion, an isolation step is required for whole extract materials wherein isoelectric precipitation techniques are used, generally at acid pH, especially pH 4.75, with centrifugation to separate the protein. Precipitation should be at a fairly high temperature, and therefore precipitation is to be preferably carried out right after digestion when the digestion medium is at approximately 100°F. It has been discovered that a non-gelling protein results if this precipitation is not accomplished.

The second essential step is treatment of the gellable protein after enzymatic digestion by exposure of the isolated and digested protein to a relatively high pH (higher than that used in digestion). Exposure to high pH results in a better gelling protein after only a short time (approximately five minutes) in the case when ficin is used at pH of 9 –9.5, the optimum pH is 10.5 during this exposure, but slightly higher pH values are acceptable (11–11.5). It is necessary also to conduct this exposure to high pH after digestion, since if it is exposed to this pH before digestion, an insoluble protein results. The temperature of exposure is not critical to gelling properties but for preserving solubility it is desired to conduct it at a cool temperature and 5°–10°C has been selected as practical. The time is not critical in this step, and while five minutes is sufficient, times of as long as 24 hours are not detrimental to the gelling characteristic of a product.

Following exposure to this pH for a brief interval, the pH is reduced to about neutral (6.8 pH for ficin) before the protein is dried. The final pH adjustment is necessary for if the pH of the material prior to drying is above 7, it is found gellation is retarded. Similar characteristics are noted when dealing with egg white proteins.

The dried material is now treated by the addition of salt (preferably in 0.1 molar solution) at a strength of about 0.5 percent of the protein concentration. This is necessary in treating egg white, but merely preferably using the protein of this invention, since both proteins require salt to precipitate the protein and effect formation of the matrix required in gellation. If added, salt shall be added just before gelling to better the gel strength.

The ultimate step in forming a gel is to heat to about 140°–190°F for a period of about ten minutes; either 140°F or 190°F is preferred.

It is desirable to introduce sulfhydryl groups into the protein material so produced before it is formed into the gel. A desirable material for this purpose is cysteine, at concentrations of about 2–25 (preferably 18) milligrams per gram of protein, which can be added to the protein just after or along with addition of salt; also blends with about 20 percent egg white solids could be made which solids are added before or with the salt, etc. Upon addition of salt, these blends will gel in a solution of about 3–10 percent protein when heated to 140°–190°F for 10 minutes. Clearly, higher percentages could be used but for economical reasons a maximum of 10 percent protein is used.

Two types of gel tests were used.

A. Qualitative Gelation Test — (Time of Gelation Method)

This involves heating at a specific temperature of a tube containing 1–2 ml. of protein solution plus optional additives for a specific interval of time. The nature of the gel was defined as follows: No gel (NG), weak gel (WG), medium gel (MG), and strong gel (SG). These judgments were made depending on the fluidity of the gel after heating. The strong gel formed a solid plug which would not flow when the tube containing the gel was inverted. A weak gel remained fluid after heating, but was greater in viscosity than the unheated protein solution.

Two different temperatures were used with this method. It was found that testing at 140°F would not suffice for the purpose of complete comparison with egg white. The tests were at 190°F or 140°F.

B. Gelometer Test

A gelometer (gel strength meter) was devised by which the strength of the gel could be investigated while subjected to a continuous pressure (FIG. 1). In FIG. 1, a gel 2 is subjected to pressure via diaphragm 4, applied through beam 6 by reason of weight 8. The pressure is adjustable by adjusting pivot support 10, attached at pivot 12, to beam 6. Movement of diaphragm 4 downward in gel 2 is transmitted to and indicated by pointer 14. The gel strength is measured by depression readings.

In general, gellation as measured by depression readings as a function of time are divided into two factors $D_0$ and $D_t'$. Depression D is directly given in cgs units in mms./Barye and has two elements, viz., the initial depression which occurs almost instantaneously as soon as pressure is applied ($D_o$), and the depression as a dynamic function of time and pressure ($D_t$). To further define the properties of gels, it may be desirable to compare these components where $D = D_o + D_t'$ and $D_t = D_o + K_1 t^K$. In this formula, log $t$ is time in seconds and $K_1$ and $K_2$ are constants for a given gelling protein. A plot of log $(D_t - D_o)$ against $t$ is linear with the slope equal to $K_2$ and the intercept equal to log $K_1$.

$K_1$–$K_2$ values has been determined for the most common enzyme by digesting and isolation protein under the same conditions and measuring gels on the gelometer. The results show

| Enzyme | $K_1 \times 10^2$ | $K_2$ |
|---|---|---|
| | (~) | (~) |
| Ficin | 0.60 | 0.28 |
| Bromelin | 0.80 | 0.375 |

-continued

| Enzyme | $K_1 \times 10^2$ | $K_2$ |
|---|---|---|
| Papain | 0.90 | 0.65 |

The lower $K_1$ the better the gel strength and the value of $K_2$ while more difficult to define is believed to reflect the water holding stability of the gel and to be desirably high if it is to approach that measured for egg white. $K_1$ for egg white is about 0.26 and $K_2$ is about 0.68 when measured on the gelometer.

Before specifically discussing the invention by way of example, it should be noted that the protein material produced according to this invention is unique. It has, in addition to the gelling properties, whipping properties which are also of commercial interest. There are a variety of modified soy protein products described in the prior art which exhibit whipping properties and are specifically intended to be used as substitutes for egg whites in such applications. The whipping characteristics of the protein of this invention are secondary and are a natural consequence of the protein molecule degradation which is affected to produce the gelling characteristics. None of the prior art whippable protein compositions are equivalent to the protein of this invention since they do not exhibit characteristic gelling properties of the invented protein.

The materials of this invention exhibit $D_o$ values which approach the values measured for egg white at 10 percent protein concentration when heated for 10 minutes at 90°C at pH 6.9 in the presence of Na Cl (0.5m). $D_t$ values approach that of egg white solids with increased time and after about 10 minutes equals and then exceeds the gel strength of egg white as shown in FIG. 2. The invention materials also form strong to medium gels according to test A.

In view of the characteristics of the protein of this invention, it may be adapted for a variety of food uses, such as gels, meat emulsions (frankfurters, specialty loaves), chiffon cakes, angel cakes, bakery mixes, egg white additives (adapted to enhance whipping characteristics), whipped toppings, whipped frosting mixes, encapsulating agents (e.g., sprayed dried coffee creamers and other spray-dried fat containing products requiring a film-forming protein), as binders (in all vegetable, spun fiber products or meat products), frozen desserts, beverages (requiring a protein to form a clear solution at low pH), confectionaries (whipped frappe, nougat, low moisture syrups to be aerated or marshmallow), meringues and souffles. Specific applications are used in raising omelets in which five grams of gelling protein added to a puffy omelet increase the height of the omelet and toughen the structure so that it retains shape after cooking. In meringue shells, composed of beaten egg whites, sugar and cream of tartar, which form a stiff peak when baked in a slow oven. Meringue shells are made with the gelling protein as a complete replacement for egg white, wherein the protein is used at 13% solids level. The flavor of the meringue shells was very good with no characteristic soy flavor and with a light beige color.

The specific preparation of the gellable protein according to this invention may be illustrated by the following examples.

EXAMPLE 1

Production of gelling protein by ficin digestion

Step 1.

100 grams of commercially available Nutrisoy 7B soy flakes (undenatured soybean flakes that are hexane extracted and flash desolventized) are extracted with 2,000 grams of water at pH 9 at a temperature of 103°F for one hour. Following this extraction, the mixture is centrifuged and decanted. The extracted flakes are subjected to a repeated extraction under the above conditions, using 1,000 grams water at pH 9 for ½ hour.

Step 2.

The combined supernatant liquors from the extractions are centrifuged at high speed to remove insoluble fines and exhausted flakes suspended therein.

Step 3.

The clear supernatant is filtered through glass wool and brought to a pH of 4.5 to 4.75 at 45° and centrifuged at low speed (it may also be filtered), and the supernate (the whey) is discarded.

Step 4.

The precipitated protein material (curd) is washed three times with 1000 gm water, collecting the precipitate in each instance by filtering through five mesh orlon screen using vacuum.

Step 5.

The washed precipitate is redissolved in four times its weight of water at pH about 9 whereupon the total volume is approximately 4,000 cubic centimeters and is stored overnight in a refrigerator. It is also possible to use freeze drying prior to redissolution.

Step 6.

The dissolved protein is digested with approximately 1 percent (0.001 gm/gm protein) ficin at 120°F and a pH of 9.6 for one hour cysteine can be added during or after ficin digestion.

Step 7.

The digested protein solution is brought to a pH of 4.75 to precipitate protein and the medium is then centrifuged and the supernate (whey No. 2) is discarded.

Step 8.

The precipitated digested protein is washed twice with five times its weight of distilled water, separating each precipitate as before.

Step 9.

The washed protein is suspended in water having a total volume of about 600 cubic centimeters and adjusted to a pH of 7 until dissolved. Then the pH is raised to 10.5 for 5–15 minutes. Cysteine may be added at this point if desired.

Step 10.

The pH is neutralized by addition of sodium hydroxide to approximately pH 6.85.

Step 11.

The protein material is then dried by conventional techniques. Molecular weight determination may be conducted by the electrophoretic method See *Cereal Chemistry* 49 (4): 416–420 (1972). The molecules have been broken into a heterogeneous mixture of or about the size of analbumin molecules.

In a series of examples, the procedure outlined has been used, with modifications of digestion and post digestion conditions used. The most common post digestion treatment is exposure to alkaline pH, preferably at 10.5 for 5 minutes but exposure overnight at about 5°C further improves solubility during the gel tests. This occurs above as Step 9. Other treatments include addition of cysteine at this point and (IEP) isoelectric precipitation.

Step 12.

The material is gelled by redissolving in distilled water at up to 10 percent, preferably 4–5 percent protein, and, NaCl and Cysteine are added followed by heating to either 140°F for about 20 minutes or 190°F for about 10 minutes. Gels formed by this method are found by test A to produce a medium gel and when a protein isolate is used as starting material in the identical test a strong gel results.

Using the above procedure in an extensive series of experimental runs, the following enzymes were used to prepare gelling protein materials Pepsin
Trypsin
Papain
Bromelin Both whole extract and isolated soy protein extract were successfully used but soy flour did not produce desirable gelling properties. This series of experiments allowed the following preferable range of conditions to be established 1. Digestion
   a. temperature 40°–110°F
   b. pH 9.0–9.6
   c. time 1 to 24 hours
2. Post Digestion
   a. pH raise 10.5 at 6°C 5–60 min.
   b. pH lowered to about 7
3. Gellation
   a. add cysteine and NaCl
   b. at 140°F, 20 minutes or at 190°F, 10 minutes.

Having described the invention by way of illustration and exemplification, we claim:

1. A process for producing a gellable and whippable acid-insoluble protein material comprising removing insoluble matter from a proteinaceous material to obtain an acid insoluble protein isolate, enzymatically modifying the isolate with a protelytic enzyme at alkaline pH, reisolating the digested isolate by acid precipitation and then raising the pH above the pH of digestion for a relatively short time and then neutralizing and recovering the modified acid insoluble protein material.

2. The process of claim 1 wherein the enzyme is ficin, the pH of digestion is 9–9.6 and the after treatment involves increasing the pH to about 10.5 for about 5 minutes and then reducing the pH to about 6.8.

3. A process for gelling comprising adding to the product of claim 2, at a concentration of about 2–10 percent, about 0.5 percent based on the protein weight of 0.1 molar sodium chloride solution and/or about 2 to 25 mg/gm protein of a sulfhydryl introducing compound and heating the material at a temperature of 140°–190°F until a gel is formed.

4. Process of claim 3 where the sulfhydryl introducing compound is cysteine.

5. A gellable and foamable modified vegetable protein material having a value $D_o$ about 80 percent that of egg white under the same conditions and a $D_t$ which approaches that of egg white and approximately equals that of egg white after about 10 minutes.

* * * * *